United States Patent
Jones

(10) Patent No.: US 9,183,169 B2
(45) Date of Patent: *Nov. 10, 2015

(54) SAS EXPANDER BASED PERSISTENT CONNECTIONS

(71) Applicant: Emulex Corporation, Costa Mesa, CA (US)

(72) Inventor: Marc Timothy Jones, Longmont, CO (US)

(73) Assignee: EMULEX CORPORATION, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,012

(22) Filed: Feb. 20, 2014

(65) Prior Publication Data

US 2014/0173168 A1    Jun. 19, 2014

Related U.S. Application Data

(63) Continuation of application No. 11/966,879, filed on Dec. 28, 2007, now Pat. No. 8,683,486.

(51) Int. Cl.
| | |
|---|---|
| *G06F 9/54* | (2006.01) |
| *G06F 13/40* | (2006.01) |
| *H04L 29/08* | (2006.01) |
| *G06F 3/06* | (2006.01) |

(52) U.S. Cl.
CPC .......... *G06F 13/4022* (2013.01); *G06F 3/0604* (2013.01); *G06F 3/067* (2013.01); *G06F 3/0655* (2013.01); *G06F 9/54* (2013.01); *H04L 29/08846* (2013.01); *H04L 67/145* (2013.01)

(58) Field of Classification Search
CPC .............................. G06F 9/54; H04L 41/0803
USPC ........................................................... 719/310
See application file for complete search history.

(56) References Cited

U.S. PATENT DOCUMENTS

| | | | |
|---|---|---|---|
| 7,035,952 B2 | 4/2006 | Elliott et al. | |
| 7,206,875 B2* | 4/2007 | Marushak et al. | 710/62 |
| 7,584,319 B1* | 9/2009 | Liao et al. | 710/317 |
| 7,624,223 B2* | 11/2009 | Clegg et al. | 710/316 |
| 7,913,037 B2 | 3/2011 | Nakajima et al. | |
| 2004/0190554 A1 | 9/2004 | Galloway | |
| 2007/0070885 A1* | 3/2007 | Uddenberg et al. | 370/225 |
| 2007/0073857 A1 | 3/2007 | Chang et al. | |
| 2007/0088978 A1* | 4/2007 | Lucas et al. | 714/9 |
| 2007/0220204 A1* | 9/2007 | Nakajima et al. | 711/114 |
| 2009/0094620 A1* | 4/2009 | Kalwitz et al. | 719/325 |

OTHER PUBLICATIONS

Rob, Serial Attached SCSI Techinical Overview, Apr. 29, 2002.*

* cited by examiner

*Primary Examiner* — Lechi Truong
(74) *Attorney, Agent, or Firm* — McAndrews, Held & Malloy Ltd.

(57) ABSTRACT

A network device comprising a first attach point, a second attach point, a switch and persistent connection logic is provided. The first attach point may connect the network device to a first link, and the second attach point may connect the network device to a second link. The switch may connect the first attach point to the second attach point. The persistent connection logic may create a persistent connection between a first network element and a second network element, where the persistent connection comprises the network device, the first link and the second link. The network device may also implement a non-persistent connection between two network elements, where the non-persistent connection may comprises the network device.

20 Claims, 8 Drawing Sheets

SAS EXPANDER BASED PERSISTENT CONNECTIONS

CROSS REFERENCE TO RELATED APPLICATIONS

This is a continuation of U.S. patent application Ser. No. 11/966,879, filed Dec. 28, 2007. The above-referenced United States patent application is hereby incorporated by reference in their entirety.

FIELD OF THE INVENTION

This invention relates to electronic networks in general and more specifically to providing for persistent connections over electronic networks.

BACKGROUND OF THE INVENTION

Serial Attached SCSI (SAS) is a known type of high speed network. SAS networks are often used for connecting a host (usually a storage server which is itself connected to another type of network) to a plurality of attached hard drives. However, SAS networks may be used for other purposes as well.

A SAS network may use non-shared physical links for connecting devices. Thus, the network can dedicate a physical link to one connection and that physical link may not be used by other connections until the network reassigns the links. In order not to waste the available links, a SAS network usually does not keep a link assigned to a single connection for a long time but may often tear down the connection in order to reassign the link. This practice prevents one connection from blocking up resources for too long. However, this practice may add too much overhead to communications and may, for that reason, be counterproductive in some situations.

SUMMARY OF THE INVENTION

Embodiments of the present invention provide for creating and using persistent connections in SAS networks. A persistent connection may be a connection that persists for longer than the usual SAS connection. More specifically, it is a connection that is not subject to periodic tear downs by SAS devices according to existing SAS protocols (such as, by using CLOSE or BREAK primitives). Instead, persistent connections may be removable by a link reset.

Persistent connections may be used in situations in which the overhead associated with the usual tear down and re-establishment of connections in a SAS network may be considered too high in comparison with its intended benefits. Various such situations are discussed below. Persistent connections may also be used to provide virtual direct attachment between two different SAS connected devices or between a SAS connected device and an expander. Providing a virtual direct attachment between a SAS connected device and an expander may effectively shorten the length of a SAS expander cascade based network.

DETAILED DESCRIPTION OF EXEMPLARY EMBODIMENTS

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described primarily in terms of SAS networks that are used for storage, it should be understood that the present invention is not limited to such networks and uses, but is generally applicable to other types of electronic networks. A person of skill in the art would recognize that embodiments of the present invention may be useful, for example, in networks for which the overhead associated with too frequent setting up and tear down of connections may degrade performance. Similarly, while the below disclosed embodiments primarily discuss networks in which a server acts as an initiator and various hard-drives are the targets, the invention is not limited to such types of networks and may feature many other connection configurations.

Figure 1:
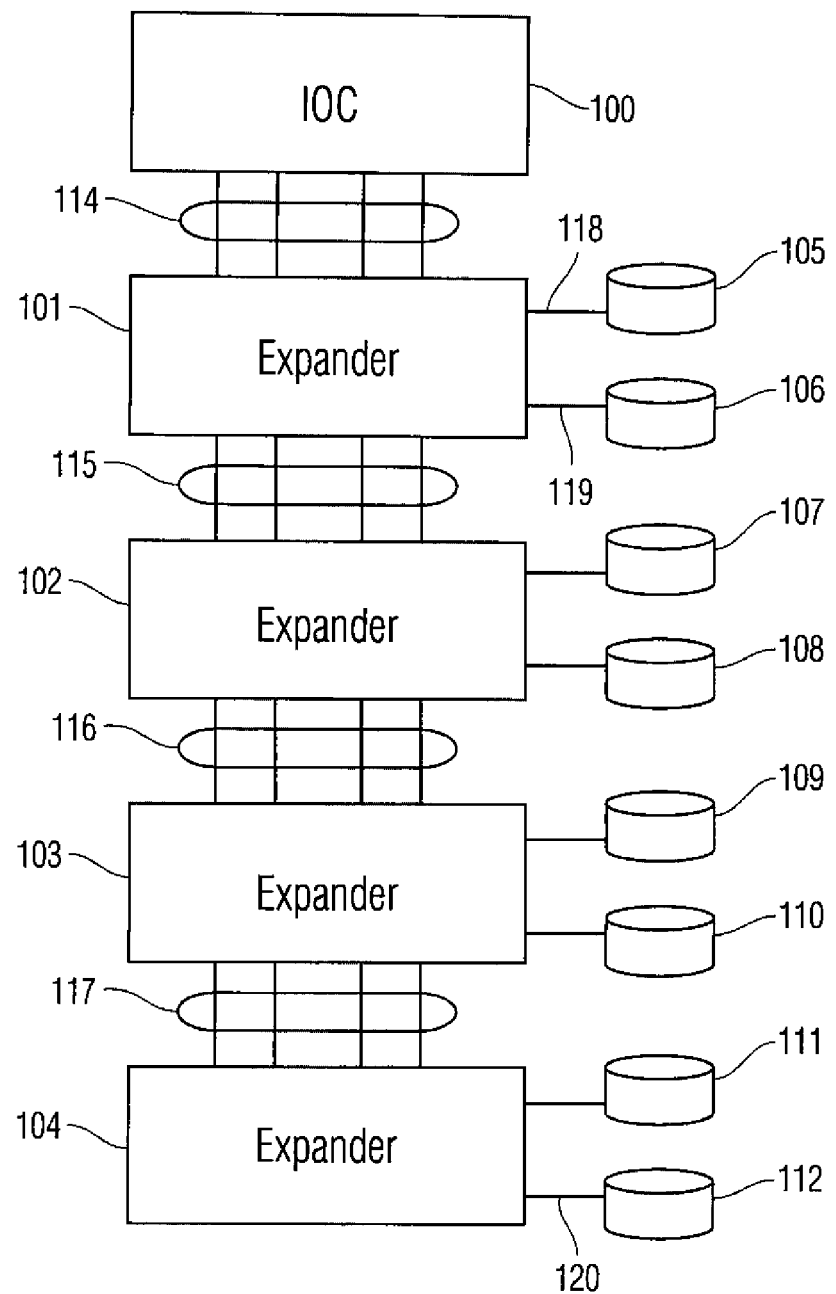
FIG. 1 is a diagram of an exemplary SAS network.

The SAS topology provides that one or more initiators may be connected to one or more targets. Initiators are devices that initiate requests and targets are devices that perform the requests. FIG. 1 is a diagram of an exemplary SAS network. The network may include an input/output controller (IOC) 100. The IOC may be an initiator. It may be, for example, part of a storage server, file server or another computer or device that needs to communicate with the targets of the network.

The IOC may be connected to a cascade of expanders 101-104. In other networks, different numbers of expanders may be used. Each expander may be connected to its adjacent expander(s) through PHYs and associated links. A link may refer to a physical link between two elements of the SAS network (such as a cable). A PHY refers to a network attach point or, in other words, the circuitry within a device (such as an expander) that connects the device to a single physical link. A connection refers to a temporal association between two PHYs for the purposes of communication (a connection can span through multiple links and multiple intermediate PHYs). The IOC may also be connected to one or more expanders through one or more links. In the example of FIG. 1, a set of four links 114 is used to connect the IOC to expander 101 and another three sets of four links (sets 115-117) are used to connect the other expanders in a cascade. Various expanders can also be connected to targets, see, e.g., links 118 and 119.

Each expander can have one or more targets connected to it. The targets may be hard dives, tape drives or other storage devices. Alternatively, the targets may be other types of devices, such as electronic cameras, printers, or any other SAS enabled electronic devices.

A SAS network may be a connection based network that uses exclusive physical links for each network connection. For example, if the IOC needs to connect to device 112, the SAS network may set up a connection between the IOC and device 112 by assigning one link from each set of links 114-117 to the connection, connecting the assigned links to each other, and finally connecting link 120 to the last of assigned links (i.e., the assigned link of set 117). The links associated with the path between the two endpoints and dedicated to such a connection may not be shared by other connections, while the connection exists.

Figure 2:
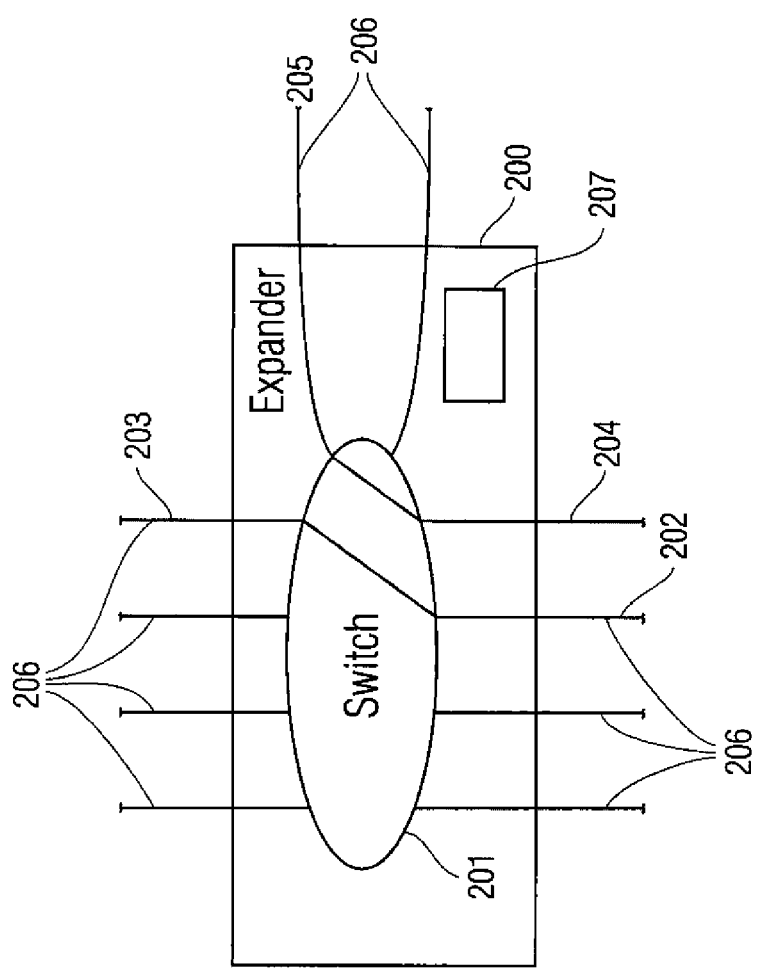
FIG. 2 is a diagram of an exemplary SAS expander according to embodiments of the invention.

FIG. 2 shows an exemplary expander 200. Various links 206 may be connected to the expander. The links may be connected to the expander through PHYs (not shown). The expander may include a switch 201. The switch may interconnect various links connected to the expander. For example, links 202 and 203 may be connected to each other by the switch. A single expander can connect multiple pairs of links at the same time, so links 204 and 205 may also be connected. In general, for N PHYs (or links), N/2 connections are possible. The expander may listen to commands arriving at the various PHYs in order to determine how to connect their associated links. The expander may also send commands to downstream PHYs and links to request other expanders to continue a connection.

The expander may also include persistent connection logic 207, for creating persistent connections between devices. The operation of persistent connection logic 207 is discussed in more detail below.

Thus, if the IOC sends a request to connect to device 112 to expander 101, each expander can make the necessary connections and forward a connection request to the next expander so that the group of multiple assigned links discussed above may be eventually connected to form a single connection between the IOC and device 112.

As noted above, an existing device (and associated SAS network) may set up and tear down connections relatively often. Thus, if IOC 100 needs to obtain data from device 112, the SAS network may create a first connection and allow the IOC to send a request for the data. The connection may be torn down after the request, without waiting for device 112 to respond through the connection. When device 112 is ready to respond, another connection will be setup. While device 112 is responding, the new connection may also be torn down, so that device 112 may need to set up further connections to complete the response.

This behavior is considered to be a benefit for existing networks, as it is believed to ensure efficient utilization of the various network resources (paths through the SAS domain). In other words, if connections are torn down quickly, then the PHYs and their associated links would not need to wait unused if they are assigned to a connection that is not being utilized for some reason (e.g., if device 112 needs some time to process data before sending it). These tear downs and resets may be performed as part of ordinary SAS connection management behavior by the initiator and the target. Usually, in SAS networks connections can be torn down during connection management by sending a CLOSE or BREAK primitive.

However, the above discussed behavior may be less than optimal in certain circumstances. Each connection tear down and set up may take some time and thus create a performance overhead. Multiple connections and tear downs may slow down the communications process. Thus, for example, when it is known that a certain connection will be necessary for a relatively long time and/or that that connection will not have much competition from other connections, it may be useful to ensure that the connection is kept alive for a longer period, or until the communication for which it was created is completed.

An example of such a connection would be the data transfer necessary for the back-up of a drive. A back-up may require transferring very large amounts of data (e.g., gigabytes) and multiple interruptions for connection teardowns and recreations may significantly slow it down. In addition, a back-up may be performed during a less busy time in the network, so there may not be much competition for PHYs and links which would make multiple connection teardowns unnecessary. In another example, a certain connection may be considered high priority, so that tearing it down in order to free up PHYs and links for other lower priority connections may be considered undesirable. In yet another example, a cascade of expanders may be relatively long. This may increase the overhead of connection setups and teardowns to such an extent that it may not be inefficient to perform the frequent connection set ups and teardowns often performed by existing SAS networks.

According to some embodiments of the present invention, the above discussed deficiencies can be addressed by establishing a persistent connection between an IOC and a target. The connection may persist for an entire transaction. A transaction may involve the issuance and completion of a substantive request (such as a request to read or write data). Alternatively, the transaction may persist over multiple requests or over multiple transactions—for example it may last for the numerous read and/or write transactions that are necessary to back-up a hard drive. In general the length of persistence of the connection may be determined by the IOC or by a computer that comprises the IOC, but is longer than the connection would have lasted in an ordinary SAS network.

Figure 3:
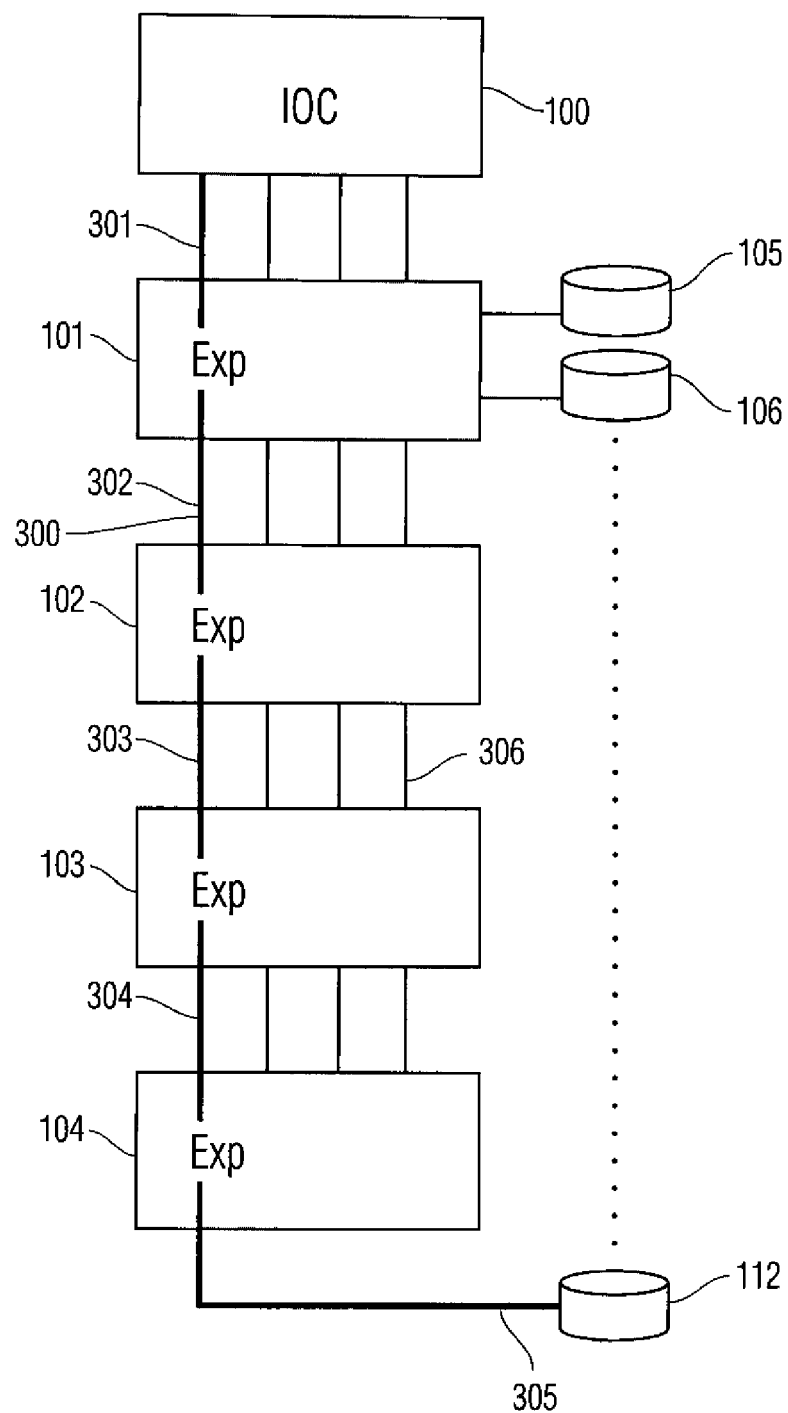
FIG. 3 is a diagram of an exemplary SAS network according to some embodiments of the invention.

FIG. 3 is a diagram of an exemplary SAS network according to the above discussed embodiments of the invention. The network of FIG. 3 may be similar to the network of FIG. 1. However, the network may be configured so that a connection between IOC 100 and device 112 (e.g., connection 300) is made to be persistent. Persistent connections, such as connection 300, are indicated in the figures by bold lines and lines that "invade" or go through the various expanders. As shown, connection 300 may comprise links 301-305 as well as expanders 101-104. While the links in connection 300 as shown include only the first links of each respective set, this need not be the case. For example, link 306 can be used instead of link 303 for connecting expanders 102 and 103. In general, a link that is to be assigned to a connection may be selected among a set of links connecting the same two expanders based on current availability of the various links and need not be in a particular position.

As noted above, persistent connection 300 may last longer than a similar connection controlled by an ordinary existing SAS network would. For example, it can last for one or more transactions. Thus, if large amount of data needs to be exchanged between the IOC 100 and the target 112, this can be performed without suffering the periodic interruptions and the interruption and reconnection overhead associated with ordinary ephemeral SAS connections.

Persistent connection 300 may be torn down when it is no longer needed, or when it is considered that using a persistent connection will no longer be efficient. After the tearing down of a persistent connection the network may proceed to operate in an ordinary manner.

In other embodiments, instead of persistently connecting an IOC with a target, an IOC can be persistently connected with an expander. This may be done to effectively shorten the length of an SAS network. For example, the network of claim 1 may be considered to have a depth of 4. That is, there are four links (or hops) between the IOC and the furthest expander (expander 104). A long network may result in significant differences of the communication efficiencies associated with targets at different locations in the network. For example, target 105 is mere 2 hops away from the IOC. Thus, connections to target 105 can be set up relatively easily. On the other hand, target 112 is relatively far from the IOC. More specifically, it is five links away from it. In order to create a connection between target 112 and the IOC, expanders 101-104 must reserve multiple different links for the connections. In a SAS network this is usually performed sequentially (i.e., expander 102 may reserve a PHY and a link after expander 101 does the same). Thus, connections between the IOC and target 112 may be much more difficult and time consuming to create.

Thus, it may be more efficient to use one or more links to directly connect the IOC to one of the latter expanders (such as expander 103 or 104). However, this may not be practical. For example, wire length limitations may not allow a direct link between an IOC and an expander that is lower in the cascade. Furthermore, permanently connecting some links of the IOC with a lower expander may reduce performance for targets connected to higher expanders.

Embodiments of the present invention may use persistent connections to provide one or more "virtual direct connections" between the IOC and lower expanders. For example, FIG. 4A shows a network similar to that of FIG. 1. However, the network of FIG. 4A includes two persistent connections between the IOC 100 and the third expander 103. It should be noted that in this embodiment the persistent connections do not proceed to a target (as was the case for the embodiment of FIG. 3) but are terminated at an expander.

Persistent connection 404 can include links 401-403 and persistent connection 408 can include links 405-407. Again while connection 404 uses only the first Phys in each set and connection 408 uses only the second ones, this need not be the case. Differently ordered links of each set may be used for each connection and may be properly interconnected by the various expanders.

Each persistent connection can be used as part of a larger connection between the IOC and a target. For example, if the IOC needs to be connected to target 112, then either of the persistent connections can be used to provide that connection. Thus, for example, persistent connection 404 can be combined with links 409 and 410 to form an entire connection between the IOC and target 112. The connection between the IOC and the target may be referred to as an end to end connection. The end to end connection itself need not be persistent in this embodiment (as opposed to the embodiment of FIG. 3, where end to end connection 300 is in fact persistent). Thus, the end to end connection may be torn down relatively often in accordance with existing SAS protocols.

Each persistent connection can operate as a direct connection while it is active. Thus, while each persistent connection includes multiple links it can behave as a single link. Thus, during set up and tear down of an end to end connection, the persistent connections may not be itself torn down. Instead it may be treated, in its entirety as a single link. For example, the end to end connection from the IOC to target 112 discussed above may be torn down and reformed using persistent connection 404, link 410 and link 411 (instead of 409). Alternatively, that end to end connection may be reformed using persistent connection 408, link 411 and link 410. Or, in another alternative, it may be reformed without using any of the persistent connections, but instead using links 412, 414, 415, 409 and 410. In either event, the persistent connections would not be torn down as a result of the tearing down of the end to end connection. However, the persistent connections may be torn down as a result of an explicit command to tear down the persistent connections (usually performed by issuing a link reset).

Thus, from the point of view of end to end connections at expanders 103 and 104, the persistent connections act as direct connections. Therefore, they may be referred to as virtual direct connections. Thus, FIG. 4B is a conceptual representation of the network of FIG. 4 which indicates the persistent connections' ability to emulate direct connections.

Figure 4B:
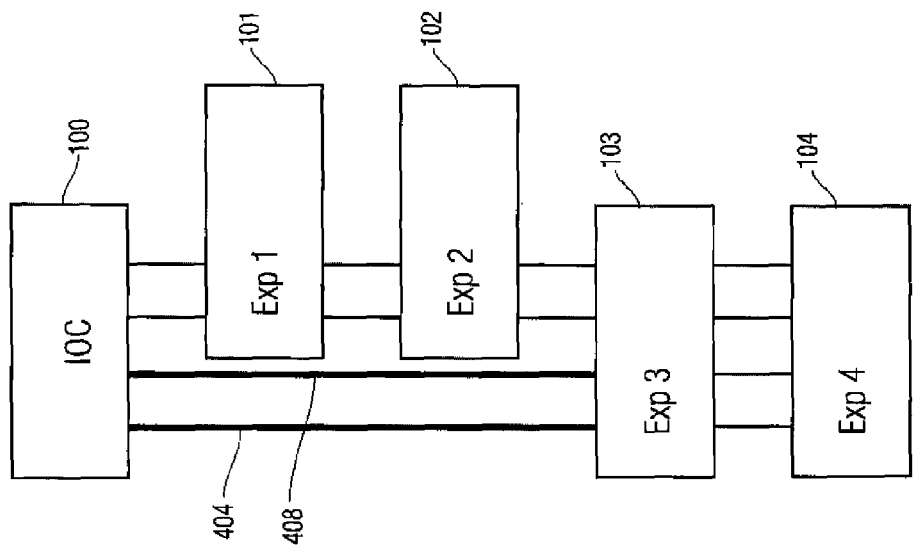
FIG. 4B is a conceptual representation of the network of FIG. 4A.
Figure 4A:
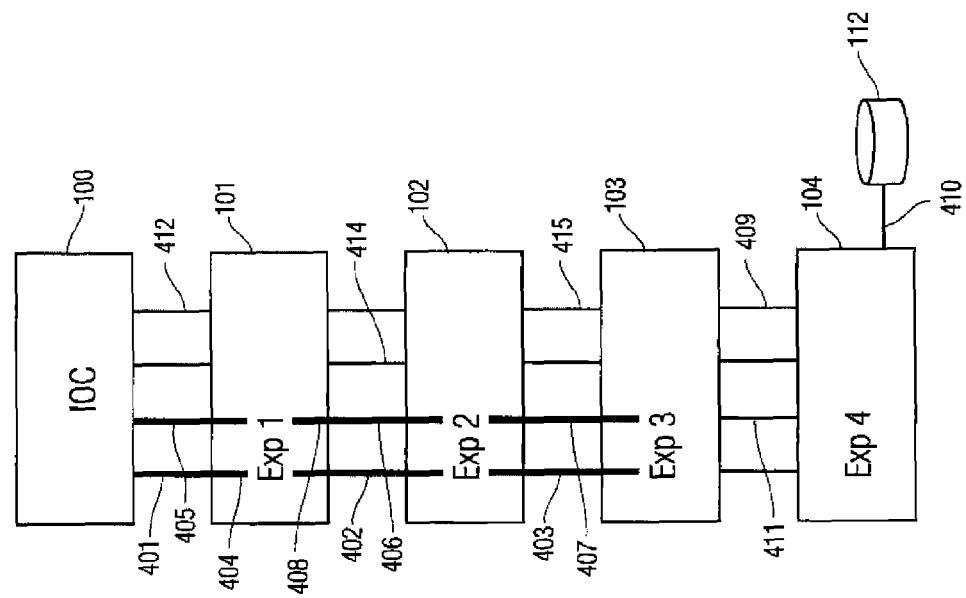
FIG. 4A is another diagram of an exemplary SAS network according to some embodiments of the invention.

Thus, as shown in FIG. 4B, persistent connections 404 and 408 can be effectively considered to be direct connections from the IOC to expander 103. Thus, the effective distance between the IOC and expanders 103 and 104 is reduced and the overhead of setting up and tearing down connections between the IOC and targets connected to Expanders 103 and 104 is reduced. In this scenario, the latency remains (through the domain), but the connection overhead is removed resulting in better performance over many transactions.

Using virtual direct connections implemented through persistent connections may have several advantages over using actual direct connections. First, as noted above, it may be impossible to directly connect the IOC to expander 103 due to wire length limitations of the SAS standard. Second, using persistent connections may provide for greater flexibility. Persistent connections may be torn down and created on the fly without requiring plugging and unplugging of cables. Thus, persistent connections 404 and 408 may be torn down in the event that their use is no longer efficient. For example, an embodiment of the present invention may automatically create virtual direct connections (i.e., persistent connections) to lower extenders if the communication load to and from targets connected to lower extenders becomes too heavy. If that load lightens, the virtual direct connections may be automatically torn down. Other advantages may also be apparent to one of skill in the art.

While the above embodiments have been described in connection with SAS networks with a single IOC for clarity, a person of skill in the art would recognize that they are also applicable for networks with multiple IOCs.

Figure 5:
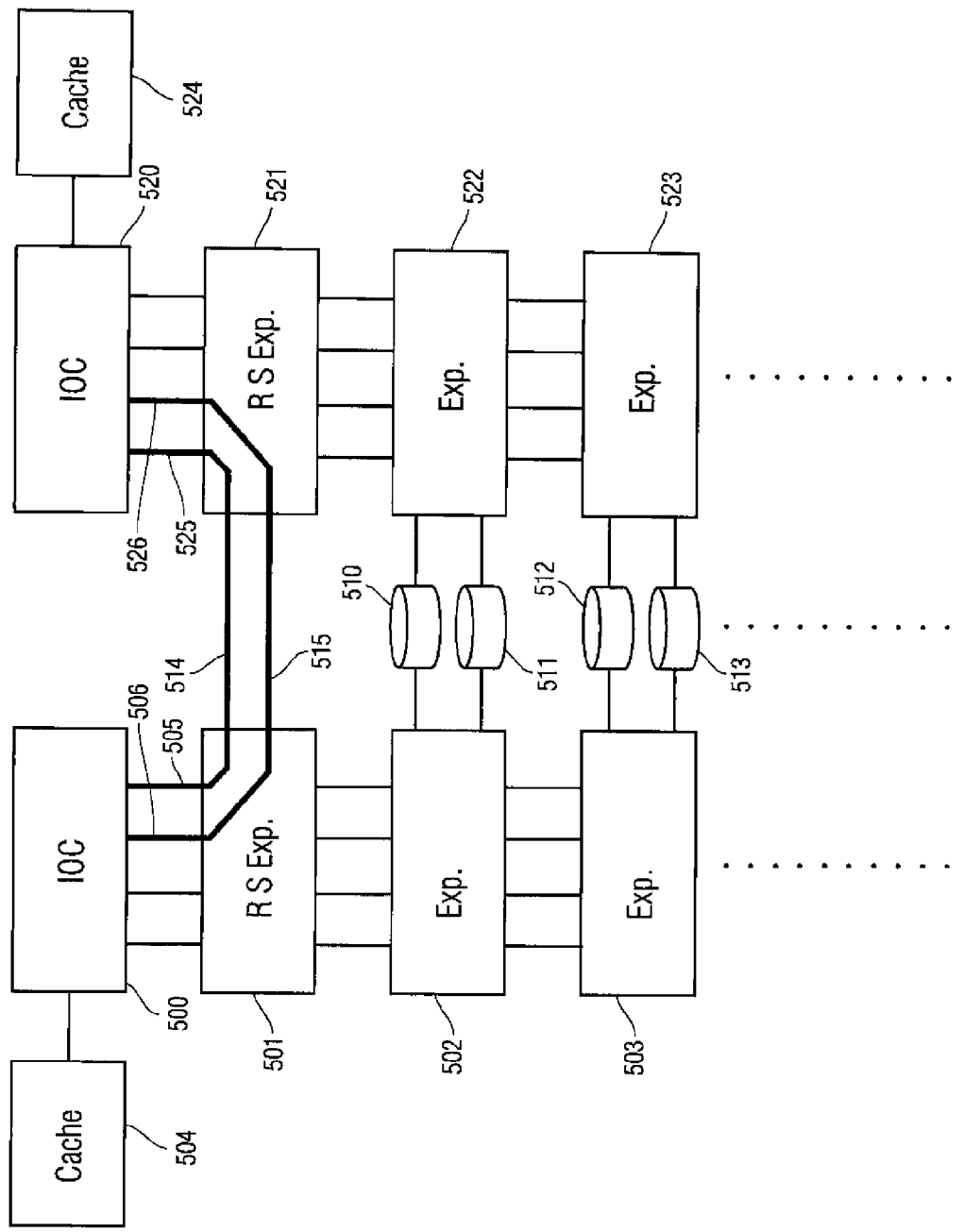
FIG. 5 is a diagram of an exemplary multi IOC SAS network according to some embodiments of the invention.

FIG. 5 is a diagram of an exemplary SAS network according to yet other embodiments of the invention. FIG. 5 shows a SAS network that includes two IOCs—IOCs 500 and 520. The two IOCs may be parts of a single host or of two different hosts. Each IOC may be connected to an associated cascade of expanders. Thus IOC 500 may be connected to a cascade of expanders including expanders 501-503 and IOC 520 may be connected to a cascade including expanders 521-523. The first expanders below each IOC (expanders 501 and 521) may be referred to as root switch expanders. The root switch expanders may be connected to each other (as shown) in order to allow the IOCs to communicate between each other. The root switch expanders may or may not be connected to any targets (FIG. 5 shows that they are not thus connected).

The two cascades of expanders may be connected to the same set of targets. Thus, both IOCs may be connected to the same set of targets through their respective cascades of expanders. For example, IOCs 500 and 520 may each be connected to target 510 through expanders 501 and 521, respectively. The targets may feature dual PHYs for that purpose.

This dual IOC configuration may be provided to overcome IOC related limitations in order to better utilize the targets. Thus, if IOC 500 is operating at peak capacity while accessing targets 510 and 511 and there are additional requests for access of targets 512 and 513, IOC 520 may execute these additional requests.

To further improve performance, each IOC may be connected to a respective cache memory (cache memories 504 and 524 being connected to IOCs 500 and 520 respectively). The IOC may store or read information from its cache instead of a target and later propagate any changes to the target (and/or load additional information from the target). Thus, at any time each cache may include data that is either currently stored or is about to be stored in one or more of the targets. However, since the caches of the two IOCs are based on the same set of targets, cache coherency must be ensured between the two caches. Thus, changes need to be propagated not only from each cache to the targets, but from one cache to the other.

Communications between IOCs 500 and 520 may be used to ensure cache coherency. These communications may be performed through the two root switch expanders 501 and 521. In existing systems these inter IOC communications may be performed utilizing the existing SAS protocols. However, in existing systems, the inter IOC communications may suffer from frequent tear downs and set ups and their associated overhead costs.

Cache coherency between the two IOCs is an ongoing requirement; therefore, it may be considered likely that cache coherency related communications will persist throughout operation of the system. Furthermore, often large amounts of data must be exchanged between the IOCs to ensure cache coherency. Therefore, embodiments of the present invention may provide for persistent connections between the two IOCs in order to ensure that cache coherency related communications are performed quickly and efficiently.

For this purpose, links 505, 514 and 525 can be combined into a single persistent connection. This would allow for much faster transfer of data between IOCs 500 and 520 and thus for a higher bandwidth. Furthermore, to further improve bandwidth, a second persistent connection may also be created. The second persistent connection may include, for example, links 506, 515 and 526. In some embodiments, each of the two persistent connections can be used to transfer data in a respective direction.

Thus, persistent connections can be used to ensure more efficient and faster inter IOC communications. These benefits may be obtained for cache coherency communications as well as other types of inter IOC communications.

Figure 6:
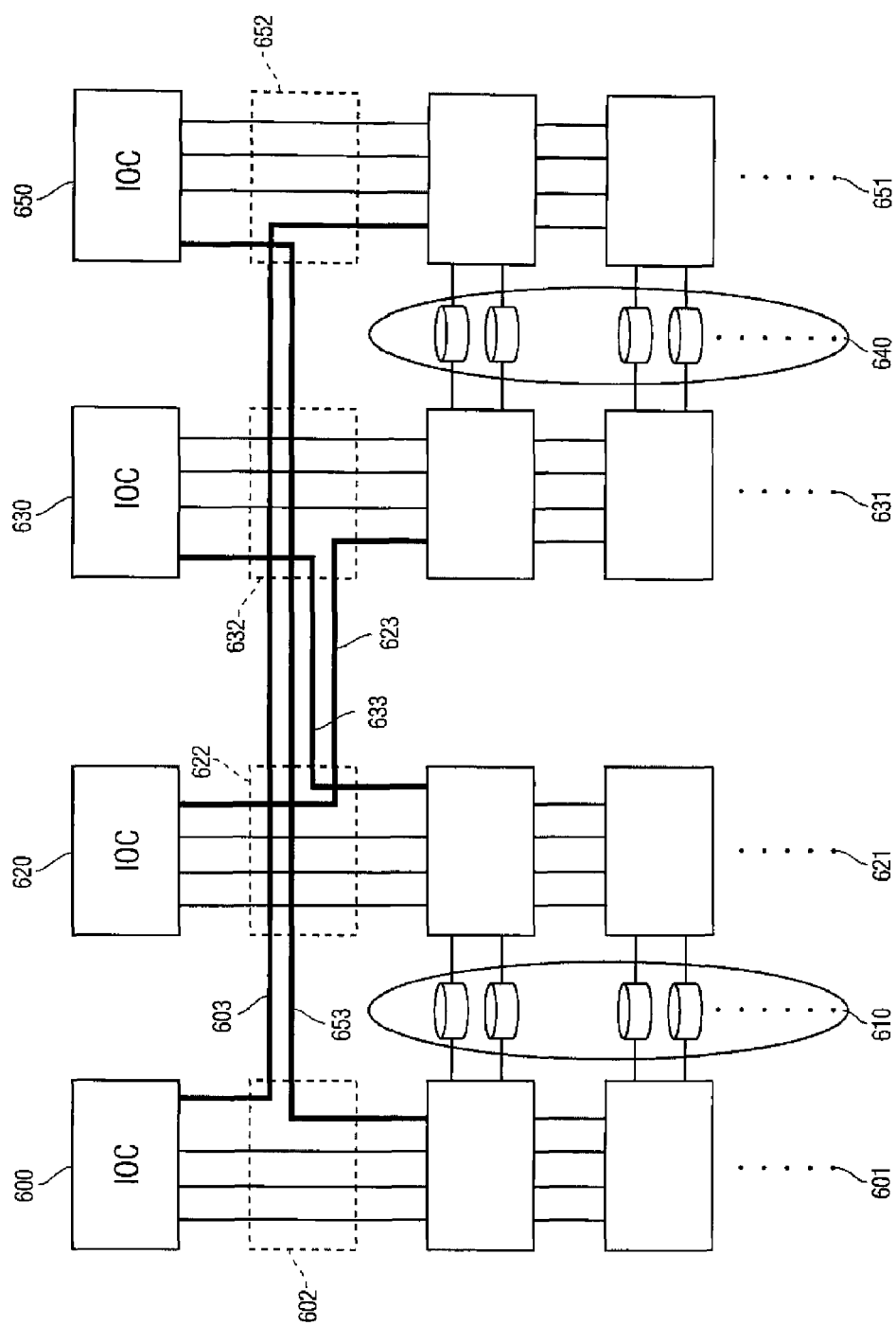
FIG. 6 is another diagram of an exemplary multi IOC SAS network according to some embodiments of the invention.

FIG. 6 is a diagram showing another type of multi IOC SAS network. The network of FIG. 6 may include four IOCs—IOCs 600, 620, 630 and 650. Each IOC may be connected to a respective cascade of expanders (601, 621, 631 and 651, respectively). The top expander of each IOC can be a root switch expander. Thus, root switch expanders 602, 622, 632 and 652 are connected to IOCs 600, 620, 630 and 650 respectively. For clarity, root switch expanders 602, 622, 632 and 652 are shown as being "transparent", i.e. they show the connections they facilitate as uninterrupted wires going through them (this why these expanders are shown in broken lines). However, the various connections the root switch expanders facilitate are not solid wires but connections that travel through internal switches of the root switch expanders, and that may be switched in another manner.

The expanders may connect their respective IOCs to various targets. Thus, IOCs 600 and 620 are connected to a set of targets 610 through their cascades of expanders 601 and 621. Similarly, IOCs 630 and 650 are connected to set of targets 640 through their respective expander cascades 631 and 651.

In the system of FIG. 6, two different IOCs can connect to the same targets through their distinct cascades of expanders thanks to dual porting of the targets (as is the case for the system of FIG. 5 discussed above). However, in the system of FIG. 6 some IOCs cannot connect to some targets through their own cascades of expanders. More specifically, expanders 600 and 601 cannot connect to set of targets 640 through their own expanders. Similarly, IOCs 630 and 650 cannot connect to set of targets 610 through their own expanders.

However such connections may be necessary. Being able to connect all IOCs to all targets may be helpful to improve the performance and reliability of the overall system. Thus, the various IOCs may be connected to some targets through the cascade of expanders of other IOCs. Thus, IOC 600 may be connected to cascade of expanders 651 of IOC 650 in order to reach targets 640. IOC 650 may connect to the cascade of expanders 601 of IOC 600 in order to reach targets 610, and so on.

These interconnections can be performed through the root switch expanders 602, 622, 632 and 652. Each root switch expander may connect to one or more neighboring root switch expanders through links. The root switch expander may connect the various links in such a manner as to realize the connections shown in FIG. 6. More specifically, the root switch expanders can realize connections 603, 623, 633 and 653 connecting each of the various IOCs with the expander cascades of another IOC.

In existing systems, connections 603, 623, 633, and 653 may be implemented as ordinary SAS connections. Thus, they may be often torn down and re-established according to the usual SAS protocols. However, communications between IOCs 600 and 620 and targets 640 (as well as those between IOCs 630 and 650 and targets 610) may be frequent and of high bandwidth. Thus, the usual SAS protocols may slow down these communications through the overhead of frequent connection tear downs and set ups. Therefore, according to embodiments of the present invention, connections 603, 623, 633 and 653 may be made persistent connections. Thus, communications between the IOCs and targets connected to other IOCs can be relatively fast, and there need not be a significant performance penalty for trying to access a target through an IOC that is not connected to the target through its own cascade of expanders.

A person of skill in the art would recognize that a number of variations of the system of FIG. 6 may be made. For example, a larger number of IOCs and cascades of targets may be present. Furthermore, each IOC may be connected to multiple cascades of expanders of other IOCs, in order to connect to multiple different sets of targets. Also, an IOC can be connected to the cascade of expanders of another IOC through multiple connections. These variations and any others that may be apparent to one of skill in the art can be embodiments of the present invention.

Figure 7B:
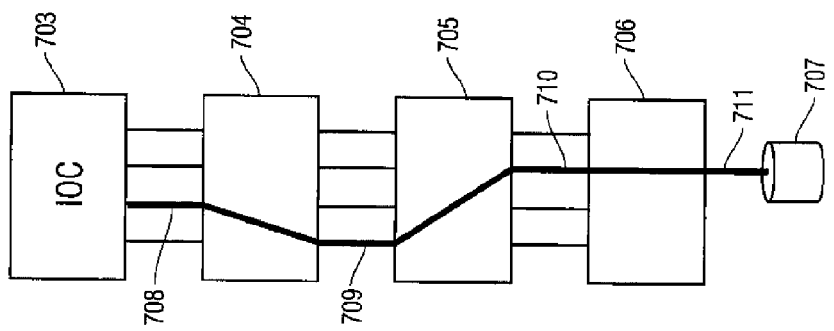
FIGS. 7A and 7B are diagrams showing the forming of persistent connections according to some exemplary embodiments.
Figure 7A:
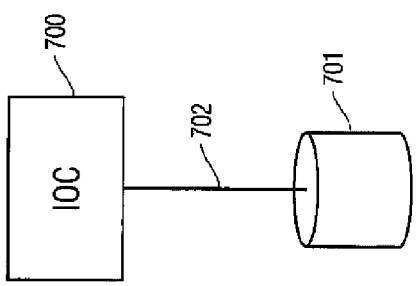

FIGS. 7A and 7B are diagrams showing the forming of persistent connections. FIG. 7A shows an IOC 700 directly connected to a target 701 through a single link 702. In such a direct connection, there is no possible competition for link 702 because it can only connect IOC 700 and target 701; there are no other possible connections. Thus, the usual reason for breaking up a connection (competition for PHYs and links between multiple desired connections) is not present. Therefore, ordinary SAS protocols provide that in such a situation a connection may be established between the IOC and the target and not be periodically broken up. The connection may only be broken up by the issuance of a link reset signal (which is usually used when various devices are restarted, or plugged out, plugged in, etc.) Thus, the connection of FIG. 7A is essentially a persistent connection.

After link reset, each device may send out an identification message (such as, for example an IDENTIFY frame) to all its PHYs to indicate its presence. Thus, if the network of FIG. 7A is reset, the IOC and the target would each send out an IDENTIFY frame. The IOC and the target may receive the identifications from the other device and determine that they are directly connected. Then they may set up the type of persistent connection discussed above.

FIG. 7B shows another network. There, IOC 703 is connected to target 707 through expanders 704-706. It may be desirable to set up a persistent connection between the IOC and the target as shown in bold (i.e., a persistent connection comprising links 708-711).

According to some embodiments, the persistent connection may be set up by the expanders 704-706 by simulating to IOC 703 and target 707 the appearance of a direct connection between the IOC and the target. For that purpose, the expanders may first allocate PHYs and links for the persistent connection (i.e., links 708-711). Then, the expanders can send a reset signal to the IOC and the target to trigger their initialization mechanisms. More specifically, expander 704 can send a reset signal to IOC 703 through link 708 and expander 706 can send a reset signal to IOC 707 through link 711.

As a result of the reset signals, the IOC and target may send IDENTIFY frames on links 708 and 711, respectively. In an ordinary network, these IDENTIFY frames can be received by the closest expanders (i.e., expanders 704 and 706) and the expanders can also send out IDENTIFY frames indicating to the IOC and the target that they are connected to expanders. However, this behavior would result in an ordinary SAS expander based connection which will be periodically torn down according to existing SAS protocols.

However, in the present embodiment, the expanders may instead forward the IDENTIFY frames across the entire connection. Thus, the IDENTIFY frame issued by the IOC can be forwarded by expanders 704-706 through links 709-711 to the target, and the IDENTIFY frame issued by the target can be forwarded back to the IOC. This places the IOC and the target under the impression that they are directly connected to each other (or, in other words, that are in a network of the type shown in FIG. 7A). Thus, the IOC and the target may set up a persistent connection between each other. Once the persistent connection is set up, the target and the IOC will keep the connection up and will not tear it down as would be the case for the usual expander based connection. Expanders 704-706 can then just forward communications back and forth between the IOC 703 and the target 707. If the expanders determine that the persistent connection must be torn down, then expanders 704 and 706 can again send a reset signal over links 708 and 711 and trigger initialization. Subsequently, the expanders can operate in an ordinary manner (i.e., by identifying themselves to the IOC and target) and may thus set up an ordinary non-persistent SAS connection between the target and the IOC.

A persistent connection of the type shown in FIG. 4A may also be established between the IOC and an intermediate expander among expanders 704-706. For example to establish a persistent connection between the IOC and expander 706, expander 706 may send initialization information to expander 705 and expanders 705 and 704 may forward that information to the IOC. Thus, the IOC may be placed under the impression that is directly connected to expander 706 and, as a result, establish a persistent connection with it.

Figures 8A, 8B:
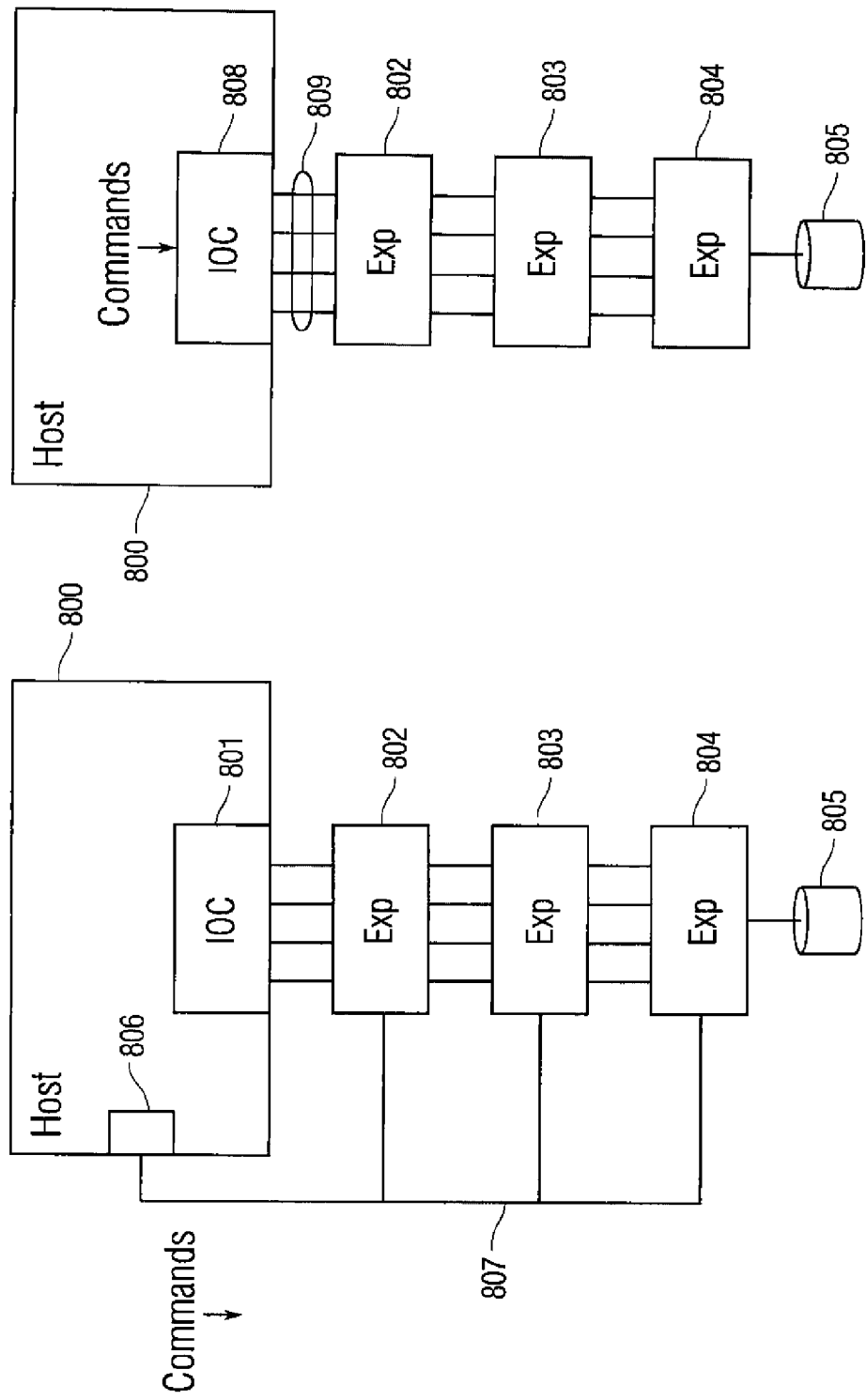
FIG. 8A is a diagram showing an exemplary system for propagating commands to the expanders according to some embodiments of the invention.
FIG. 8B is another diagram showing an exemplary system for propagating commands to the expanders according to some embodiments of the invention.

The expanders may set up and tear down persistent connections based on externally received commands. FIGS. 8A and 8B show two schemes for propagating these commands according to various embodiments of the invention.

FIG. 8A show san IOC 801 as part of a host 800. The host 800 can be a computer, such as a file server, or another type of computing device. The host may include a CPU a memory and the CPU may execute various computer instructions (or software) from the memory. IOC 801 may connect the host to target 805 through expanders 802-804 and various links as shown. While only target 805 is shown, more targets may be present.

The host may also include a persistent connection controller 806. The persistent connection controller may send commands to the expanders 802-804 for setting up and or tearing down persistent connections between the IOC 801 and the target 805 (or other targets). Furthermore, the persistent connection controller can issue commands for setting up persistent connections between the IOC and expanders down the line for it (i.e., connections of the type shown in FIG. 4A).

In some embodiments, the persistent connection controller can set up persistent connections based on instructions from the host (e.g., the host's CPU). Alternatively, the persistent connection controller can be independently programmed and configured to set up certain types of persistent connections. In some embodiments, the persistent connection controller or the host's CPU may monitor network communications of the host in order to determine what types of persistent connections may be useful to improve performance.

The persistent connection controller may be connected to the various expanders through a link 807. The link 807 may be an out-of-band link, or a link that is not part of the SAS network defined by the IOC, controllers 802-804, and their connected targets. For example, link 807 may be an Ethernet link. Alternatively, link 807 may be a wireless link, or another type of link. Link 807 may allow for broadcast messages only, or it may allow for messages that are individually addressed to the various expanders.

In the embodiments of FIG. 8A, neither the IOC 801 nor the target 805 need to be specially designed or configured for the advanced features of embodiments of the present invention. On the contrary, ordinary existing IOCs and targets may be used.

FIG. 8B shows another scheme for providing control for persistent connections. FIG. 8B shows a network very similar to that of FIG. 8A. However, the IOC 808 of FIG. 8b may be specially configured for the present invention. The IOC may receive commands for setting up persistent connections from the host 800 (e.g., commands may be received from the CPU of the host over an internal bus). It may then send the commands to the expanders through the actual SAS network (e.g., over links 809.

For example, IOC 808 can issue an ordinary SAS request to setup a connection to target 805. However, the IOC can set a predefined flag (the flag may be one that is not being used by standard SAS) in the request to indicate that the connection should be a persistent connection. Expanders can forward the flag to subsequent expanders and reserve PHYs for the persistent connection. The IOC may then issue an identification, which may be forwarded to the target in order to set up the persistent connection. Since the IOC in this case may be aware of the present invention, it may not be necessary to forward identification information from the target to the IOC in order to place the IOC under the impression that it is directly connected to the target (as discussed above in connection with FIGS. 7A and 7B).

The IOC can tear down a persistent connection by resetting the link for the persistent connection (i.e., performing a link reset). In some embodiments, the IOC need not receive commands from the host to control persistent connection, but may be itself independently configurable to set up such connections. In some embodiments, the IOC may be able to monitor traffic, determine when and what type of persistent connections may be beneficial, and set up such connections. In other embodiments, the host may monitor traffic to determine beneficial persistent connections and send commands to the IOC for setting them up.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A Serial Attached SCSI (SAS) network, comprising:
a first controller comprising a first cache memory;
a second controller comprising a second cache memory;
a first expander circuit operably connected to the first controller; and a second expander circuit operably connected to the second controller and to the first expander circuit, wherein a persistent connection comprises the first expander circuit and the second expander circuit, the persistent connection used to enable cache coherency between the first cache memory and the second cache memory, the persistent connection enabling virtual access to a storage device, the persistent connection being removable according to a link reset message, wherein the link reset message is different than a CLOSE message or a BREAK message.

2. The SAS network of claim 1, wherein the persistent connection is a virtual direct connection between the first controller and the second controller, behaving as a single link.

3. The SAS network of claim 1, wherein the persistent connection is not subject to teardowns of a first connection management behavior.

4. A network device comprising:
a first attach point circuit for connecting the network device to a first physical link, the first attach point circuit comprising a first cache memory;
a second attach point circuit for connecting the network device to a second physical link, the second attach point circuit comprising a second cache memory;
a physical switch for connecting the first attach point circuit and the second attach point circuit to each other; and
persistent connection logic configured to create a persistent connection between a first network element and a second network element, the persistent connection comprising the network device, the first physical link, and the second physical link, the persistent connection enabling cache coherency between the first cache memory and the second cache memory,
wherein the network device is operable to implement a non-persistent connection between two network elements, the non-persistent connection comprising at least the network device, the non-persistent connection being removable according to a CLOSE message or a BREAK message, and the persistent connection being removable according to a link reset message, wherein the link reset message is different than the CLOSE message or the BREAK message.

5. The network device of claim 4, wherein
the non-persistent connection is subject to teardowns of a first connection management behavior and overhead costs associated with the teardowns, and
the persistent connection is not subject to the teardowns of the first connection management behavior and the associated overhead costs.

6. The network device of claim 5, wherein
the teardowns of the first connection management behavior are based on a CLOSE message or a BREAK message, and
the link reset message is not a CLOSE message or a BREAK message.

7. The network device of claim 4, wherein the persistent connection is a virtual direct connection between the first network element and the second network element, behaving as a single physical link while including the first physical link and the second physical link.

8. The network device of claim 4, wherein the persistent connection is set up by a simulation, to at least one of the first network element and the second network element, of the appearance of a direct connection between the first network element and the second network element.

9. The network device of claim 8, wherein, for the simulation, the network device
receives an identify message issued at the first network element, and
forwards the received identify message toward the second network element to place the second network element under the impression that the second network element is directly connected to the first network element.

10. The network device of claim 4, wherein the persistent connection and the non-persistent connection both comprise the network device, the first physical link, and the second physical link.

11. The network device of claim 4, wherein the first network element and the second network element of the persistent connection are the two network elements of the non-persistent connection.

12. The network device of claim 4, wherein the network device is a Serial Attached SCSI (SAS) expander.

13. The network device of claim 4, wherein
the first network element is an initiator, and
the second network element is a target, an expander, or an input/output controller.

14. The network device of claim 13, wherein
the initiator is an input/output controller, and
the target is a disk.

15. An apparatus comprising:
a controller for sending commands to one or more network devices for setting up a persistent connection between a first network element and a second network element,
wherein the one or more network devices comprises:
a first attach point circuit for connecting to a first physical link, the first attach point circuit comprising a first cache memory; and
a second attach point circuit for connecting to a second physical link, the second attach point circuit comprising a second cache memory,
wherein the persistent connection comprises the one or more network devices and the first physical link and the second physical link, the persistent connection being removable according to a link reset message, the persistent connection enabling cache coherency between the first cache memory and the second cache memory,
wherein at least one of the one or more network devices is operable to implement a non-persistent connection between two network elements, the non-persistent connection comprising said at least one network device, the non-persistent connection being removable according to a CLOSE message or a BREAK message, wherein the link reset message is different than the CLOSE message or the BREAK message.

16. The network device of claim 15, wherein the persistent connection is a virtual direct connection between the first network element and the second network element, behaving as a single physical link while including the first physical link and the second physical link.

17. The network device of claim 15, wherein
the non-persistent connection is subject to teardowns of a first connection management behavior, and
the persistent connection is not subject to the teardowns of the first connection management behavior.

18. A network comprising:
a first cascade of one or more expander circuits comprising a first root switch expander circuit for connecting to a first initiator, an expander circuit of the first cascade operable to connect to a target, the first cascade of one or more expander circuits comprising a first cache memory;
a second cascade of one or more expander circuits including a second root switch expander circuit for connecting to a second initiator, the second cascade of one or more expander circuits comprising a second cache memory,
wherein the first root switch expander circuit and the second root switch expander circuit are configured to create a persistent connection between the second initiator and the target through the first root switch expander circuit and the second root switch expander circuit, the persistent connection being removable according to a link reset message, the persistent connection enabling cache coherency between the first cache memory and the second cache memory,
wherein the first root switch expander circuit and the second root switch expanders are operable to implement a non-persistent connection between the second initiator and the target through the first root switch expander circuit and the second root switch expanders, the non-persistent connection being removable according to a CLOSE message or a BREAK message, wherein the link reset message is different than the CLOSE message or the BREAK message.

19. The network device of claim 18, wherein the persistent connection is a virtual direct connection between the first network element and the second network element, behaving as a single physical link while including the first physical link and the second physical link.

20. The network device of claim 18, wherein the non-persistent connection is subject to teardowns of a first connection management behavior, and
the persistent connection is not subject to the teardowns of the first connection management behavior.

* * * * *